US011340594B2

(12) United States Patent
Bulanda et al.

(10) Patent No.: US 11,340,594 B2
(45) Date of Patent: May 24, 2022

(54) SYNCHRONIZATION OF INDUSTRIAL AUTOMATION PROCESS SUBSYSTEMS

(71) Applicant: Rockwell Automation Technologies, Inc., Mayfield Heights, OH (US)

(72) Inventors: Nicole R. Bulanda, New Berlin, WI (US); Fabio M. Mielli, Alpharetta, GA (US); Andrew J. Schaeffler, Whitefish Bay, WI (US); Peter A. Morell, Royalton, OH (US); David C. Mazur, Mequon, WI (US); Barry N. Elliott, Spring, TX (US); Scotty Bromfield, Johannesburg (ZA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 291 days.

(21) Appl. No.: 16/543,112

(22) Filed: Aug. 16, 2019

(65) Prior Publication Data
US 2021/0048798 A1  Feb. 18, 2021

(51) Int. Cl.
*G05B 19/418* (2006.01)
*H04J 3/06* (2006.01)
*G06N 20/00* (2019.01)

(52) U.S. Cl.
CPC ..... *G05B 19/4185* (2013.01); *G05B 19/4183* (2013.01); *G05B 19/41865* (2013.01); *G06N 20/00* (2019.01); *H04J 3/0661* (2013.01)

(58) Field of Classification Search
USPC ........................................... 702/188
See application file for complete search history.

(56) References Cited

U.S. PATENT DOCUMENTS

| 2017/0102696 A1* | 4/2017 | Bell | G05B 23/024 |
| 2017/0351241 A1* | 12/2017 | Bowers | G05B 19/406 |
| 2018/0299878 A1* | 10/2018 | Celia | G05B 23/0286 |
| 2020/0265331 A1* | 8/2020 | Tashman | G06N 7/005 |

* cited by examiner

*Primary Examiner* — Paul D Lee

(57) ABSTRACT

Techniques to facilitate synchronization of industrial assets in an industrial automation environment are disclosed herein. In at least one implementation, a computing system receives time-series industrial process data associated with a plurality of process subsystems of an industrial automation process. The time-series industrial process data is fed into a machine learning model associated with the industrial automation process to dynamically generate a process duration prediction for a first one of the process subsystems and responsively determine an updated set point for a second one of the process subsystems based on the process duration prediction for the first one of the process subsystems. The updated set point for the second one of the process subsystems is provided to an industrial controller associated with the second one of the process subsystems.

20 Claims, 6 Drawing Sheets

SYNCHRONIZATION OF INDUSTRIAL AUTOMATION PROCESS SUBSYSTEMS

TECHNICAL FIELD

Aspects of the disclosure are related to computing hardware and software technology.

TECHNICAL BACKGROUND

Various manufacturing processes and other industrial operations occur in industrial automation environments. Some examples of industrial automation environments include industrial mining operations, automobile manufacturing factories, food processing plants, oil drilling operations, microprocessor fabrication facilities, and other types of industrial enterprises. Industrial automation environments typically involve many complex systems and processes which are often spread out over various disparate locations. For example, in industrial mining operations, drilling and excavation may occur at several different mining sites to extract ore from the earth, which may then be transported to remote mineral processing plants for further processing to recover desired minerals. Several mechanical and chemical techniques may be employed to aid in the recovery of the target minerals.

Industrial automation environments utilize various machines during the industrial manufacturing process, such as drives, pumps, motors, compressors, valves, robots, and other mechanical devices. These devices have various moving parts and other components that are driven by instructions received from industrial controller systems. Machine builders, solution providers, and other content creators typically produce the control logic needed to run on these industrial controller systems in order to control the mechanical functions of the devices and carry out their intended functions.

Industrial environments also commonly include a human-machine interface (HMI). An HMI typically receives and processes the status data from the machines to generate various graphical displays, which may indicate the current and historical performance of the machines. In traditional implementations, the HMI may also provide a mechanism for an operator to send control instructions to a control system that controls the machines. For example, an operator might use the HMI to direct the control system to update drive parameters, turn on a pump, speed-up a motor, or stop a robot.

OVERVIEW

Techniques to facilitate synchronization of industrial assets in an industrial automation environment are disclosed herein. In at least one implementation, a computing system receives time-series industrial process data associated with a plurality of process subsystems of an industrial automation process. The time-series industrial process data is fed into a machine learning model associated with the industrial automation process to dynamically generate a process duration prediction for a first one of the process subsystems and responsively determine an updated set point for a second one of the process subsystems based on the process duration prediction for the first one of the process subsystems. The updated set point for the second one of the process subsystems is provided to an industrial controller associated with the second one of the process subsystems.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
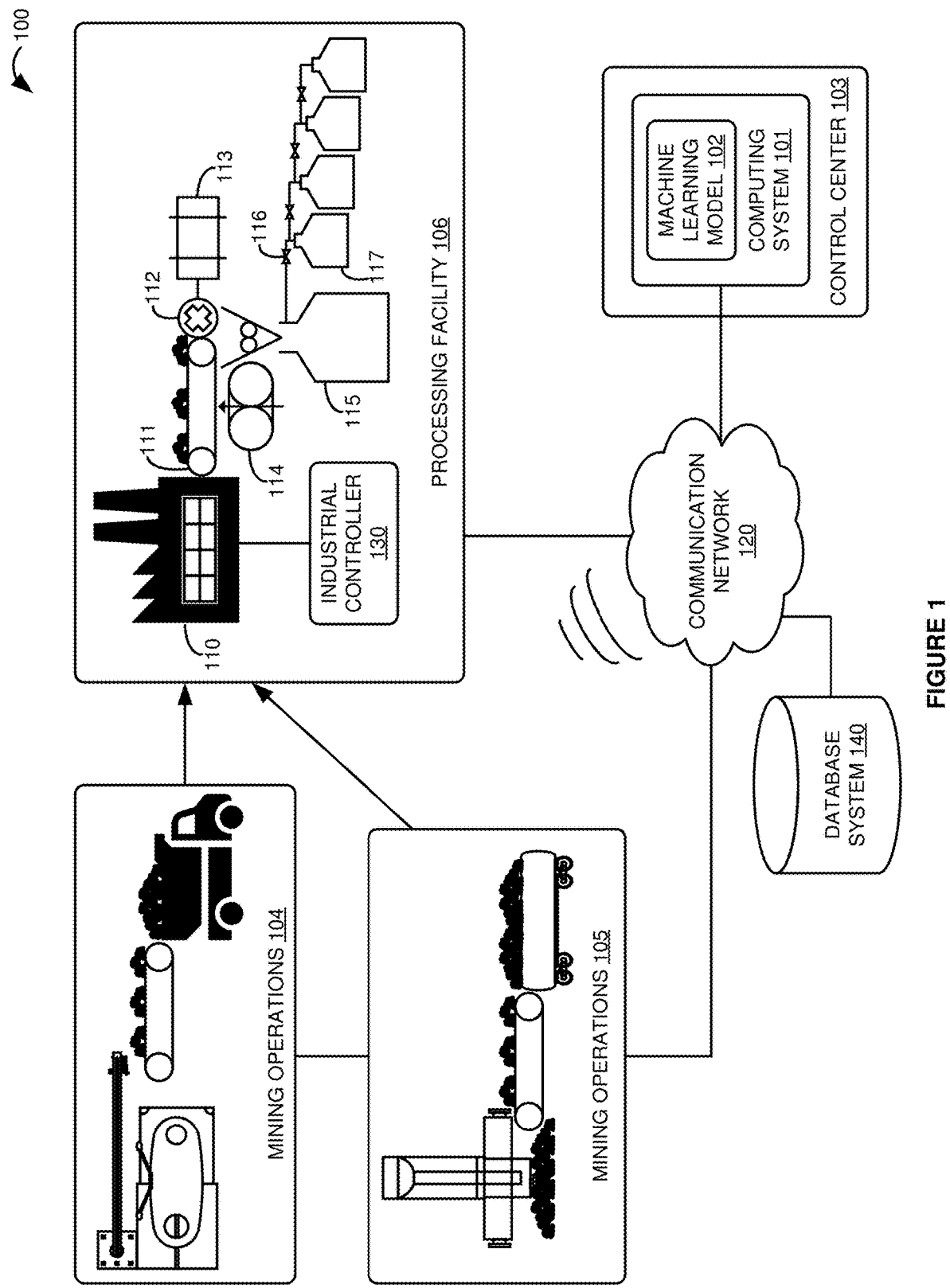
FIG. 1 is a block diagram that illustrates an industrial automation mining environment in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In large-scale industrial automation systems, such as industrial mining operations, the industrial automation process may involve several process subsystems. For example, there are typically several steps of a process flow that may be logically partitioned into a series of process subsystems, such as extraction, transportation, crushing, grinding, and concentration in the mining industry. In some cases, each of these process subsystems may be further subdivided into additional subsystems, down to individual machines over even individual components where appropriate. Any of these process subsystems may execute sequentially or in parallel, concurrently or staggered, or any other execution sequencing, and in some cases may run asynchronous to each other. In some examples, each subsystem may operate as a stand-alone process component with separate visualization, reporting, and notifications.

Due to the distributed nature of many industrial automation systems, the process subsystems are often running at many disparate locations. For example, in industrial mining operations, drilling and excavation often occurs at several disparate mining sites to extract ore, which may then be transported to mineral concentrator plants for crushing and flotation processing to recover the desired minerals. The present disclosure provides solutions that can seamlessly link these disparate systems together, characterize data streams, and provide predictive, preventative, and prescriptive actions to improve system integration and interfacing in mining operations and other industrial automation systems.

Implementations disclosed herein provide for synchronizing, linking, and aggregating disparate process subsystems across the many separate locations of an industrial automation system. For example, most mining operations involve disparate systems with silos of operational data from equipment to the highest levels of the organization, where critical operations require synchronization of real-time and historical information to function effectively. The techniques described herein provide a scalable automation and information solution by linking and centralizing data aggregation from disparate systems to provide contextualized data that provides optimized operational performance. By integrating, contextualizing, and characterizing time-synchronized data streams, the system is able to provide predictive, preventative, and prescriptive actions for optimization of industrial process subsystems. In some examples, predictive and optimization models may be enhanced with artificial intelligence, machine learning, and deep learning techniques to generate duration predictions for process subsystems and determine updated set points for other subsystems to adjust and compensate for the subsystem duration predictions. In some embodiments, the predictions and optimizations generated by the machine learning models may be provided to an industrial controller to implement the optimizations and take preventative measures to better coordinate the process subsystems and improve the overall stability and efficiency of the system.

Figure 2:
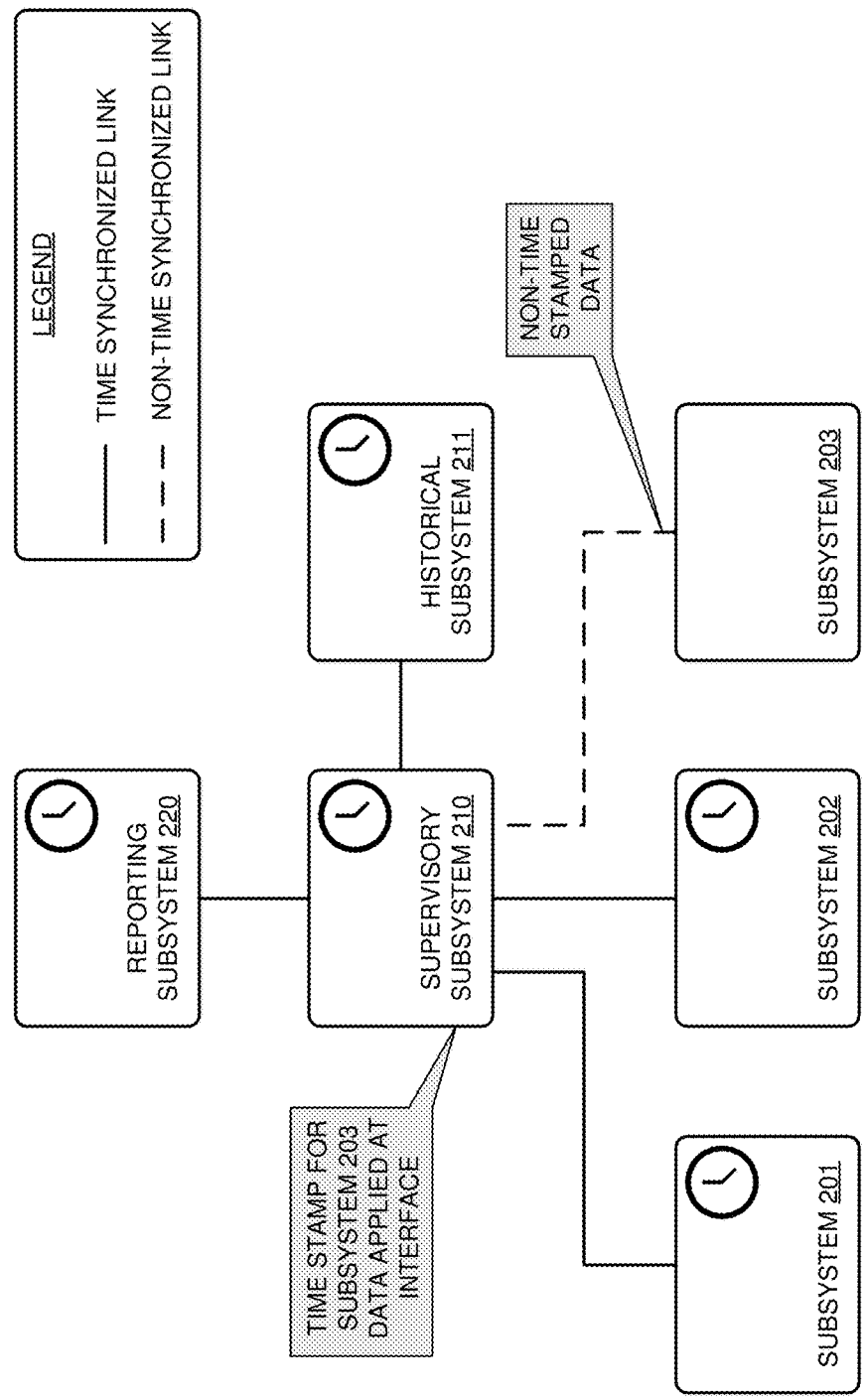
FIG. 2 is a block diagram that illustrates an operation in an industrial automation environment to enable time synchronization of subsystems in an exemplary implementation.
Figure 3:
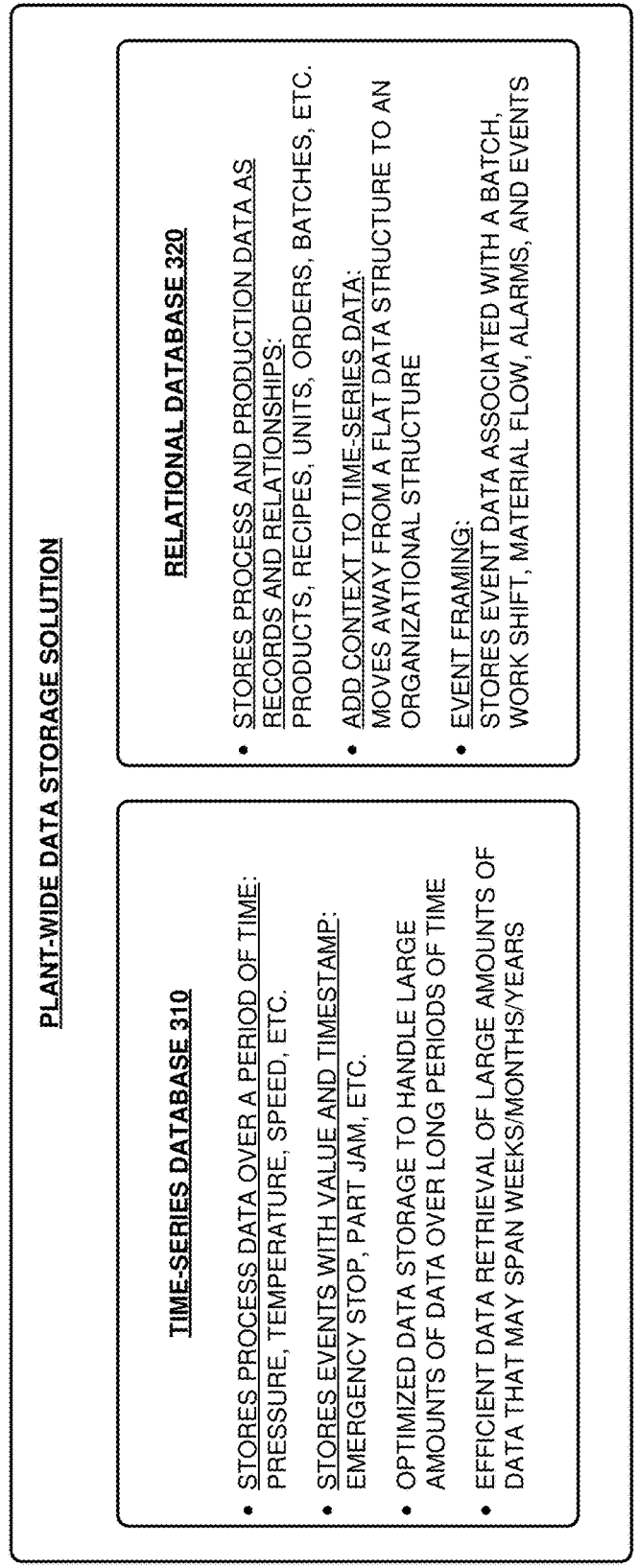
FIG. 3 is a block diagram that illustrates data storage solution in an exemplary implementation.
Figure 4:
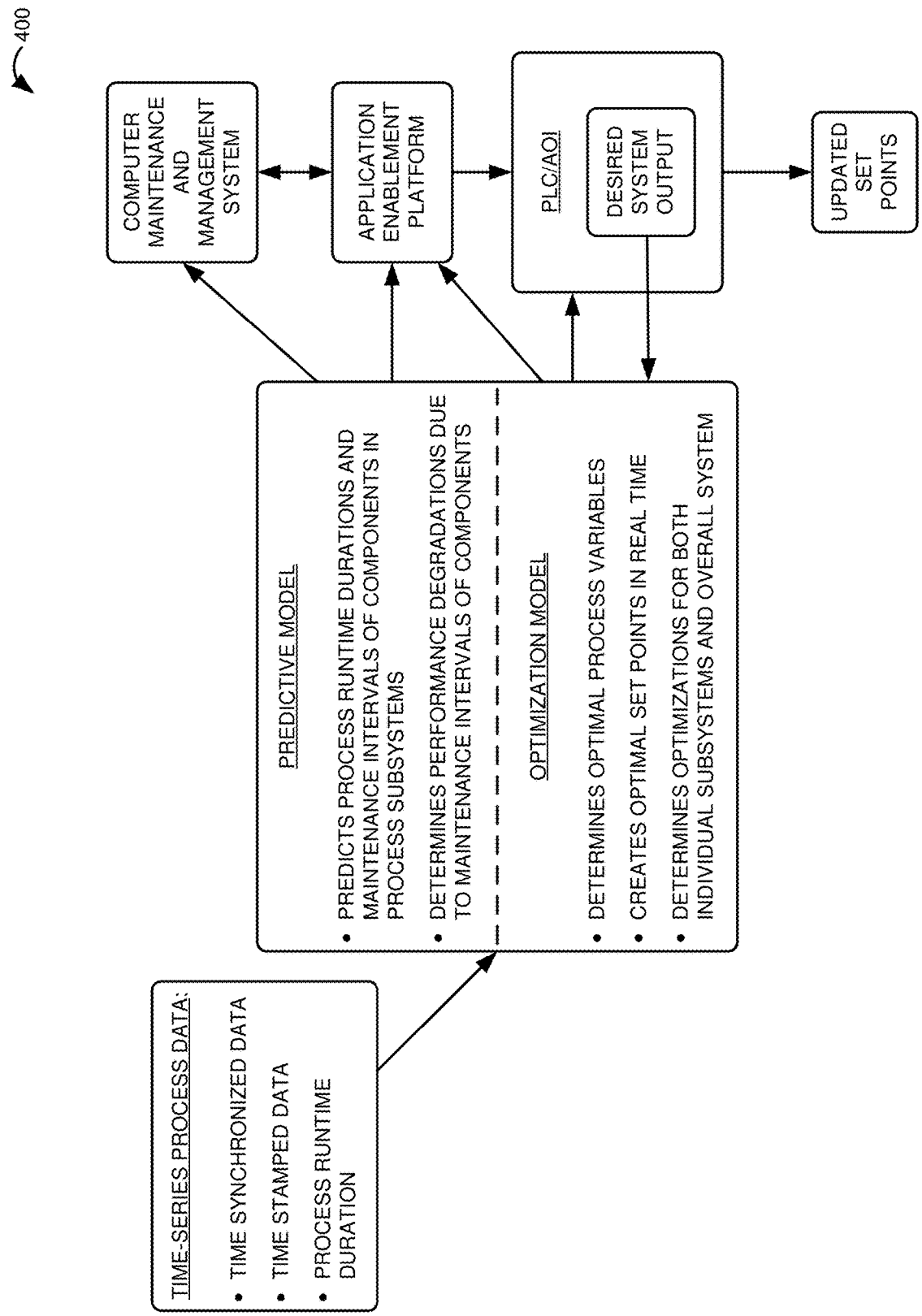
FIG. 4 is a block diagram that illustrates an operation of a predictive and optimization model in an exemplary implementation.
Figure 5:
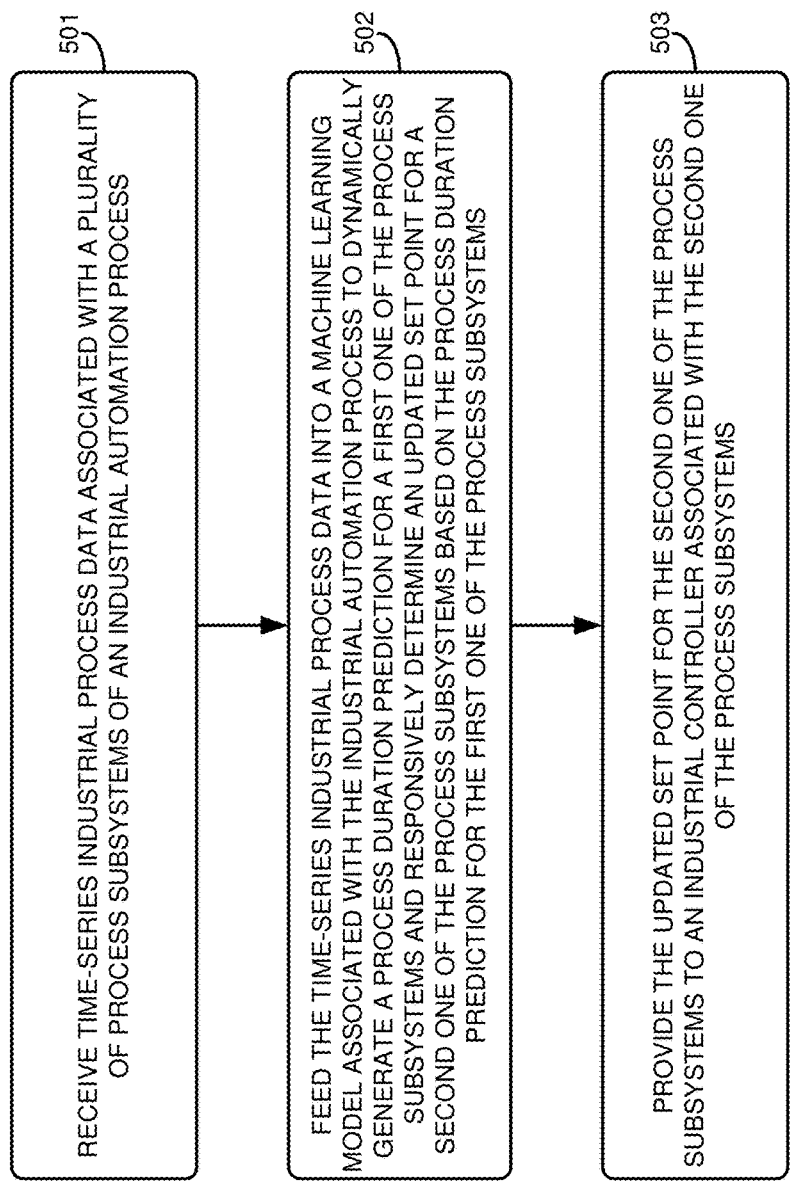
FIG. 5 is a flow diagram that illustrates an operation of a computing system in an exemplary implementation.
Figure 6:
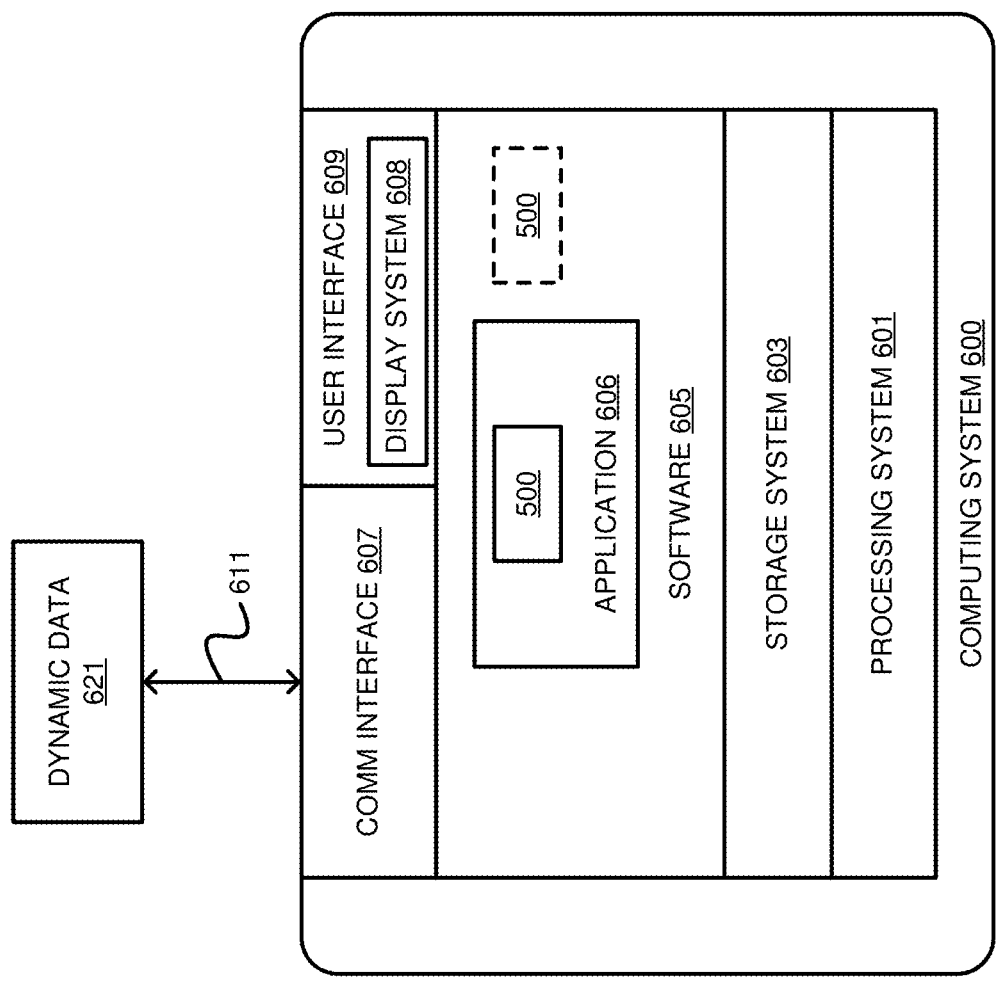
FIG. 6 is a block diagram that illustrates a computing system in an exemplary implementation.

Referring now to the drawings, FIG. 1 illustrates an exemplary industrial automation mining environment that may employ machine learning models to facilitate synchronization of industrial assets employed in process subsystems of an industrial automation process. FIG. 2 is a block diagram that illustrates an exemplary operation of time synchronizing process subsystems. FIG. 3 is a block diagram that illustrates an exemplary data storage solution. FIG. 4 is a block diagram that illustrates an exemplary operational scenario involving a predictive and optimization model to improve process subsystem synchronization and performance. FIG. 5 is a flow diagram that illustrates an exemplary operation to facilitate synchronization of industrial assets in an industrial automation environment, and FIG. 6 illustrates an exemplary computing system that may be used to perform any of the subsystem synchronization processes and operational scenarios described herein.

Turning now to FIG. 1, industrial automation mining environment 100 is illustrated in an exemplary embodiment. Industrial automation mining environment 100 provides an example of an industrial automation environment that may utilize any of the techniques disclosed herein, but note that the present disclosure could equally apply to any other industrial application. Industrial automation mining environment 100 comprises a distributed mining system that includes mining operations 104 and 105 and processing facility 106. In this example, processing facility 106 comprises concentrator plant 110 that employs froth flotation techniques to improve mineral concentrations recovered from ore extracted at disparate mining operation sites 104 and 105. Concentrator plant 110 includes conveyor belt 111, crusher 112, motor 113, compressor 114, surge tank 115, valves 116, and flotation cells 117. Processing facility 106 also includes industrial controller 130.

As shown in FIG. 1, industrial automation mining environment 100 also includes computing system 101, communication network 120, and database system 140. Computing system 101 includes and executes machine learning model 102. In this example, computing system 101 is located at a remote control center 103 that is geographically separate from mining operations 104 and 105 and processing facility 106. Computing system 101 is in communication with mining operations 104 and 105 and processing facility 106 over communication network 120. Industrial controller 130 and any of the industrial assets 111-117 of processing facility 106 may communicate over communication network 120 via standard communication links, which could comprise wired links and/or wireless links, including cellular links, or any other communication links. In some examples, communication network 120 could comprise an on-premise private network or private cloud accessible over a local network connection, a public cloud-based environment accessible over a wide area network such as the Internet, a direct connection such as a bus or serial link, or any other data communication technique, including combinations thereof. The techniques described below with respect to FIG. 1 could be executed by the systems of industrial automation mining environment 100 such as computing system 101 and industrial controller 130, and could be combined with operation 500 of FIG. 5 in some implementations.

In operation, ore is extracted off-site at drilling and excavation sites and delivered to processing facility 110 at a disparate location for flotation cell processing. The extracted ore is transported on conveyor belts 111 and ground into fine particles using crusher 112 operated by motor 113 so that the material is reduced to physically separate grains. This particulate matter is then mixed with water to form a slurry and contained within surge tank 115. The desired mineral is rendered hydrophobic by the addition of a surfactant or collector chemical reagent. The resulting pulp is then introduced to flotation cells 117 by opening valves 116 which is then injected with air or nitrogen from compressor 114 and agitated to form bubbles. The hydrophobic particles containing the desired mineral then attach to the bubbles which rise to the top and collect on the surface as a froth. The froth is then removed from the cell, producing a concentrate of the desired mineral.

In order to carry out the above operations, industrial controller 130 executes control logic code to dispatch control instructions over communication network 120 to control the operation of industrial assets 111-117. In this example, the various subsystems involved in the industrial mining process could have several interlocks and dependencies on each other that necessitate synchronization of the process subsystems. For example, crusher 112 may be operated at a certain rate by motor 113 to produce a desired level of granularity, and conveyor belt 111 may be set to run at a compatible rate to deliver ore for grinding in crusher 112 that ensures a steady supply of ore is provided without overloading crusher 112. The conveyor 111 process subsystem should therefore be synchronized with the crusher 112 and motor 113 subsystem in order to ensure optimal and efficient operational performance. Likewise, the transport and delivery of ore extracted from mining operations 104 and 105 should be synchronized with the rate of conveyor 111 to ensure enough supply is available without creating excessive stockpiling at concentrator plant 110. In some examples, this synchronization of process subsystems between operations could be achieved by passing signals and data related to operational execution rates and process running time durations to computing system 101, which may function as a process management system to help orchestrate the timing of all of the subsystems. For example, computing system 101 could synchronize the process subsystems using queues and prioritizations based on time in order to arrange the various subsystems into the appropriate time sequence and ensure all interlocks for a particular process subsystem have completed in the correct order and at the appropriate time in order to initialize the next step of the process.

Through continuous use, the various components and subsystems employed in flotation cell mineral processing typically degrade over time, and may require maintenance and repairs to restore and sustain desired performance. For example, the performance of crusher 112 typically declines over time due to a wearing down of the rollers and other elements used to grind the mineral ore, which therefore require periodic maintenance and replacement. Accordingly, in this example computing system 101 operates to generate predictive and preventative maintenance determinations for the various subsystems and devices employed in concentrator plant 110, such as industrial assets 111-117. For example, computing system 101 may receive operational parameters, process variables, performance values, and other information associated with the process subsystems of the mining operation, and then feed this data into machine learning model 102. In at least one implementation, machine learning model 102 then performs a deep analysis on this operational data using artificial intelligence and machine learning techniques in order to determine maintenance event predictions, maintenance interval recommendations, and other predictive determinations for industrial assets 111-117 and their associated process subsystems.

In some implementations, machine learning model 102 may be trained with physical models, historical performance data, empirical performance curves, maintenance event definitions, and other relevant data that describes the operation and performance of industrial assets 111-117 and other process subsystems. These performance curves and physical models of the various assets 111-117 are then analyzed by machine learning model 102 along with the process variables, operational parameters, and other values in order to determine the maintenance event predictions for the devices. However, as the components of these devices progressively wear down and their performance curve changes, the physical models used to represent the devices becomes more inaccurate, since they are generally based on initial, fully-operational performance metrics. Therefore, in order to compensate for performance degradation, the physical models representing industrial assets 111-117 and other components may be continually adjusted over time, such as by calculating new offsets or other parameters associated with the models. Further, in at least one example, machine learning model 102 could be employed to calculate the offsets and other values needed to adjust the physical models and performance curves of the components used in the system. For example, through the aggregation and analysis of operational data over extended periods of time, machine learning model 102 could determine how the operational characteristics and performance curve of crusher 112, motor 113, valves 116, and any other components change during the course of their useful lifecycle, and then utilize this information to calculate the offsets and adjustments to the physical models of these components, thereby improving the accuracy of the models. Machine learning model 102 can then utilize these more finely-tuned physical models to better predict when a component may require maintenance or be reaching the end of its useful life, and determine updated set points and other improvements and optimizations for various control settings and operational parameters of industrial assets 111-117 employed in the flotation cell processing example of industrial automation mining environment 100.

In addition to the above maintenance predictions and performance model adjustments, computing system 101 could utilize machine learning model 102 to determine a process duration prediction for a process subsystem, such as crusher 112. For example, as discussed above, machine learning model 102 could be trained with historical and empirical data models and performance curves representing the performance and behavior of crusher 112. As the performance of crusher 112 declines over time due to a wearing down of the rollers and other elements used to grind the mineral ore, machine learning model 102 could use the data models and information to predict that duration of time that crusher 112 will take to complete the grinding process will increase based on the predicted or observed performance degradation. Further, because machine learning model 102 would predict that the process execution of crusher 112 would take a longer duration of time to complete based on the progressive decline in performance over time, machine learning model 102 would responsively determine an updated set point for an interrelated process subsystem, such as the speed of conveyor 111 delivering ore to be crushed, in order to better coordinate and synchronize these process subsystems and improve the overall stability and efficiency of the system. An exemplary operation of time synchronizing process subsystems will now be discussed with respect to FIG. 2.

FIG. 2 is a block diagram that illustrates an operation in industrial automation environment 200 to enable time synchronization of subsystems in an exemplary implementation. Industrial automation environment 200 provides an example of an industrial automation environment in which any of the subsystem synchronization processes and operational scenarios described herein may be implemented. The techniques described below with respect to FIG. 2 could be executed by the systems of industrial automation mining environment 100 such as computing system 101 and industrial controller 130, and could be combined with operation 500 of FIG. 5 in some implementations.

Industrial automation environment 200 includes subsystems 201, 202, and 203, supervisory subsystem 210, historical subsystem 211, and reporting subsystem 220. The subsystems 201-203 comprise any process subsystems of an industrial automation process, and could represent individual steps or sub-processes of an industrial process in some examples. For example, process subsystems 201-203 could comprise drilling, transportation, crushing, grinding, mixing, pumping, agitation, or any other industrial process subsystems, and may each involve one or more industrial assets or components.

In operation, the various subsystems 201, 202, 203, 210, 211, and 220 communicate and transfer data over either time synchronized links or non-time synchronized links, as indicated in the legend shown on FIG. 2. In particular, all of the subsystems 201, 202, 210, 211, and 220 communicate over time synchronized links, except for subsystem 203, which communicates with supervisory subsystem 210 over a non-time synchronized link, as shown in FIG. 2. The time synchronization of the communication links for synchronized subsystems 201, 202, 210, 211, and 220 could be provided by a time-synchronized component on the communication network, which could comprise an on-premise private network or private cloud accessible over a local network connection, a public cloud-based environment accessible over a wide area network such as the Internet, a direct connection such as a bus or serial link, or any other data communication technique, including combinations thereof. In some examples, the time-synchronized component that provides the time synchronization on the network could comprise a clock or time signal, global positioning system (GPS) clock, industrial controller, time server, or some other system clock signal. All devices or subsystems 201, 202, 210, 211, and 220 connected over time synchronized links are able to receive the time synchronized signal sourced from the time-synchronized component on the communication network.

Subsystems not having an ability to be time synchronized, such as subsystem 203 in this example, may be time-stamped with the closest subsystem as data flows through the enterprise. A timestamp would be applied when data from a non-synchronized subsystem is received at a subsystem or higher-level system that does have time record resolution. For example, in this scenario, subsystem 203 does not have time synchronization ability, and is connected to supervisory subsystem 210 over a non-time synchronized link. Accordingly, when the non-time stamped data is transmitted by subsystem 203 over the non-time synchronized link, supervisory subsystem 210 applies a timestamp to the non-synchronized data from subsystem 203 at the interface.

The time synchronized and time-stamped data may then be stored as time-series industrial process data in a time-series database such as a data historian. The time-series data could then be utilized by a process management computing system to integrate and coordinate process subsystems in a time-synchronized fashion in order to better orchestrate the overall process. The time-series data could also be processed with machine learning model 102 to generate predictive, preventative, and prescriptive analytics and determine recommendations and adjustments to subsystem set points and other operational settings based on the aggregation of disparate data sources in a time synchronized fashion. An exemplary implementation of a plant-wide data storage solution will now be discussed with respect to FIG. 3.

FIG. 3 is a block diagram that illustrates data storage solution 300 in an exemplary implementation. Data storage solution 300 provides a plant-wide storage solution comprising a time-series database 310 such as a data historian and a standard relational database 320. In this example, operational data associated with various process subsystems is synchronized through either time signals or timestamps as discussed above with respect to FIG. 2, and collected and aggregated as time-series data and stored in time-series database 310. Process data such as pressure, temperature, speed, and the like are stored in time-series database 310 over a period of time, and include their associated time synchronized or time-stamped metadata. Time-series database 310 also stores events with their associated values, descriptions, and times data or timestamps, such as emergency stops, part jams, overheating conditions, pressure drops or spikes, alerts, alarms, notifications, or any other events associated with the operation of process subsystems. In some examples, time-series database 310 provides optimized data storage of time-series data to handle large amounts of data over long periods of time. Time-series database 310 also provides efficient data retrieval of large amounts of data that may span weeks, months, or years.

In addition to time-series database 310, the plant-wide data storage solution 300 includes relational database 320. In relational database 320, process subsystem and production data may be stored as records and relationships, such as products, recipes, units, orders, batches, and the like. The operational data of process subsystems and any other data generated in an industrial automation system may be stored in relational database 320, which adds context to time-series data and moves away from a flat data structure to an organizational structure. Event framing or contextualization is also provided for events stored in relational database 320, such as storing event data associated with a batch, work shift, material flow, alarms, alerts, and other events. Further, event frame detection and logging for excursion events may also be provided.

The time-series database 310 and relational database 320 provide for improved storage, synchronization, organization, categorization, and contextualization of historical and real-time data associated with an industrial automation process and its various process subsystems. Once the data is stored and structured in time-series database 310 and relational database 320, the system may utilize the data to provide better alarm management with prescriptive analysis and responsive alerting of alarms and other events. The system may also process the data from time-series database 310 and relational database 320 to generate improved visualizations with time-synchronized data displayed on a graphical user interface of an industrial automation application, such as an HMI system. In some implementations, the system supports the aggregation of data streams from various subsystems for control functions. The data from time-series database 310 and relational database 320 may also be processed to provide state-space modeling of electromechanical equipment, real dashboard information for operational indications, and real-time key performance indicator (KPI) metrics of operational effectiveness over time. In some implementations, the system may also provide data orchestration and cleaning services in order to provide pre-processing for analytics calculations, and pattern recognition in rate of change or data streams for maintenance and alarm indicators. Further, in at least one implementation, the system may generate augmented reality models for various components of equipment with the ability to provide information from aggregated subsystems.

Advantageously by utilizing time-series database 310, the system enables the collection of historical and real-time data stored with an associated timestamp. Time-series database 310 provides optimized data storage of time-series data to handle large amounts of data over extended time periods and provide efficient data retrieval, and relational database 320 provides contextualization for time-series data and event framing for process event data. The time-series data stored in time-series database 310 may then be processed and analyzed to perform asset modeling of the data. Time-series database 310 also provides for efficient storage of data over prolonged periods of time, making real-time analytics robust and reliable for past, present, and future predictions. By analyzing the data in time-series database 310 and relational database 320, trend and pattern recognition may be performed within data streams for predictive maintenance, optimizations, and other process improvements. Machine learning models may also improve their artificial intelligence and process analysis by training on the time-series and relational datasets stored in time-series database 310 and relational database 320. For example, all of the operational data stored in time-series database 310 and relational database 320 may be utilized by predictive and optimizing machine learning models for training purposes, data analytics, and predictive and optimized output. An exemplary operation of a predictive and optimization machine learning model that may be used to improve synchronization and optimization of process subsystems will now be discussed with respect to FIG. 4.

FIG. 4 is a block diagram that illustrates an operation of a predictive and optimization model in an exemplary implementation 400. The techniques described below with respect to FIG. 4 could be executed by the systems of industrial automation mining environment 100 such as computing system 101 and industrial controller 130, and could be combined with operation 500 of FIG. 5 in some implementations.

In this example, time-series process data associated with process subsystems of an industrial automation process are fed into a predictive model and an optimization model that utilize machine learning techniques to predict maintenance events and determine optimal process variables, set points, offsets, and other operational settings. The values determined by the predictive and optimization machine learning models are then provided to various control systems in order to take action on the predictions and implement the optimizations, thereby improving the industrial automation process.

In operation, time-series process data associated with process subsystems of an industrial automation process are provided to both the predictive model and the optimization model. In this example, the process data includes time-synchronized data, time-stamped data, and process runtime durations that describe how long a process or subsystem takes to complete from start to finish. In some examples, the time-series process data could comprise time-stamped flow rates, motor speeds, pressures, temperatures, vibration data, and any other operational data.

The predictive model comprises a machine learning model trained on the operation of process subsystems and their associated assets and components of a particular industrial automation process. In some examples, the machine learning model may utilize physical models of the various components and subsystems in order to analyze the process data and make predictions regarding the components employed in the process subsystems. For example, the predictive model can predict wear rates and failure rates of individual parts and components that are utilized in a process subsystem. In some implementations, the predictive model utilizes the time-series process data to predict process runtime durations for process subsystems. The predictive model may also analyze the time-series process data using machine learning techniques to predict maintenance events or determine maintenance intervals for various components in the process subsystems, such as valves, motors, drives, bearings, impeller blades, compressors, sensors, transmitters, and any other industrial assets. Additionally, the predictive model could determine performance degradations of industrial assets and other components employed in the various process subsystems due to maintenance intervals of the assets and components.

In some implementations, the predictive model could utilize current and historical process runtime durations for process subsystems included in the time-series process data along with current and historical maintenance event data and predictions in order to predict the process runtime durations for process subsystems. For example, the machine learning model could be trained with historical and empirical data models and performance curves representing the performance and behavior of various industrial assets and other components that are employed in the various process subsystems. As the performance of an industrial assets or component declines over time due to use and wear, and the length of time increases since a last maintenance event or service was performed on the asset, the machine learning algorithm of the predictive model could analyze the physical model of the asset along with the time-series process data and other information to predict that the duration of time that the asset will take to complete its operation will increase over time based on the predicted or observed performance degradation of the asset over time.

The predictions generated by the predictive model may be provided to a computer maintenance and management system (CMMS) and/or an application enablement platform (AEP) in order to take action on the predictions for synchronizing process subsystems and scheduling preventative maintenance events when appropriate to help provide continuous system operation and minimize downtime. In at least one implementation, the predictive model may utilize an application programming interface (API) to communicate the process runtime duration and maintenance event predictions to the CMMS, which could analyze the predictions and responsively take various actions, such as synchronizing process subsystems, generating work orders, scheduling preventative maintenance and planned downtime, generating alarms and other notification events, conducting asset management tasks such as asset logging and asset planning, and any other actions. Additionally, in some implementations the CMMS may interact with the AEP in order to achieve some or all of this functionality. For example, events may occur that could cause the CMMS to contact the AEP to transfer control instructions such as an add-on instruction (AOI), user-defined data type (UDT) instruction, or some other logic program code to the programmable logic controller (PLC), which would process the control instructions and perform the corresponding functions. In this manner, output from the predictive model related to individual assets and components that are utilized in process subsystems, such as process runtime durations, upcoming maintenance events, recommended maintenance intervals, and other predictions may be communicated to the CMMS and/or the AEP and which can responsively instruct the PLC to take appropriate action.

Similarly, the optimization model also utilizes the machine learning model trained on the operation of the process subsystems and their associated assets and components along with the physical models of the assets in order to analyze the time-series process data and determine optimizations for those assets and their associated subsystems. In some implementations, the optimization model could utilize the machine learning model along with the physical models representing the various assets and components to determine more efficient and optimal settings for process variables associated with the various process subsystems. For example, in a industrial mining flotation cell system for concentrating a desired mineral, the optimization model could automatically determine optimizations for flotation cell level, agitation rate, air injection rate, and reagent feed rate for each individual cell subsystem in the flotation cell system. In some examples, the optimizations determined by the optimization model could include optimizations for the timing and synchronization of the system and various subsystems, energy optimizations that minimize the amount of energy used by each asset or process subsystem, optimizations to reduce the amount of resources that are used and to increase the amount of output that is produced, and optimizations for the overall process throughput. The optimization model may also dynamically create optimal set points in real time, and can determine these and other optimizations for both individual process subsystems and the overall system. The updated set points determined by the optimization model may be provided to the PLC, which can then execute code to take action and make changes to update the set points for the various assets and components of the process subsystems as directed by the optimization model. Further, at least one implementation, when the predictive model predicts that the process execution of a particular industrial asset or component would take a longer duration of time to complete based on the progressive decline in performance of the asset over time, the optimization model could responsively determine an updated set point for at least one asset or component associated with an interrelated process subsystem in order to better coordinate and synchronize these process subsystems and improve the overall stability and efficiency of the system.

In some implementations, the PLC may provide the desired system output to the optimization model, which may then be used as a basis for determining optimized settings for process variables, updated set points, proportional, integral, and derivative (PID) offsets or values, and any other system optimizations. For example, the PLC could operate in a closed-loop with the optimization model, where empirical performance curves may be provided from the optimization model to the PLC in the form of AOI or UDT instructions, and the desired or ideal system output is provided back to the optimization model by the PLC. This bidirectional communication that exists between the PLC and the optimization model enables dynamic updates to component performance curve models, allowing for the machine learning aspect of the optimization model to make adjustments to the performance curves empirically and compensate for changes or declines in asset performance over time. The optimization model can determine optimizations for individual assets and components, process subsystems, and the overall system, which may require multiple different optimization models working together collectively. For example, the optimization model could comprise several individual machine learning models that are each individually trained on separate assets or components, additional machine learning models that are trained on the operation of the several process subsystems involving the various assets and components, and one master machine learning model that operates to optimize and orchestrate the entire industrial automation process from start to finish. In this manner, an industrial automation process can be optimized for improved synchronization of the process subsystems, thereby achieving better efficiency and increased system output and process stability. An exemplary operation to facilitate synchronization of industrial assets in an industrial automation environment will now be described in greater detail with respect to FIG. 5.

FIG. 5 is a flow diagram that illustrates an operation 500 of a computing system in an exemplary implementation. The operation 500 shown in FIG. 5 may also be referred to as subsystem synchronization process 500 herein. The steps of the operation are indicated below parenthetically. The following discussion of operation 500 will proceed with reference to computing system 101, machine learning model 102, and industrial controller 130 of FIG. 1 in order to illustrate its operations, but note that the details provided in FIG. 1 are merely exemplary and not intended to limit the scope of process 500 to the specific implementation shown in FIG. 1.

Operation 500 may be employed to operate computing system 101 to facilitate synchronization of industrial assets in an industrial automation environment. As shown in the operational flow of process 500, computing system 101 receives a plurality of time-series industrial process data associated with a plurality of process subsystems of an industrial automation process (501). In some examples, the process subsystems of the industrial automation process could comprise any individual steps or sub-processes of the industrial automation process. For example, there are typically several steps of a process flow that may be logically partitioned into a series of process subsystems, and each subsystem may involve one or more industrial assets or components. In some cases, each of these process subsystems may be further subdivided into additional subsystems, down to individual machines over even individual components where appropriate.

In some examples, the time-series industrial process data could comprise any operational settings, performance metrics, sensor data, empirical curves, set points, proportional, integral, and derivative (PID) values, offsets, process variables, or any other operational data associated with the industrial automation process. In at least one implementation, the time-series industrial process data could comprise flotation cell level, agitation rate, air injection rate, and reagent feed rate. Note that additional process data could also be used in other examples, including flow rates into and out of flotation cells, motor speeds, air pressures, vibration metrics, valve tolerances, and any other operational settings or status metrics.

The time-series industrial process data is provided with time synchronization of the data. For example, the time synchronization of the data could comprise timestamps applied to the time-series industrial process data, time synchronization of the time-series industrial process data by a time-synchronizing component, or any other technique of synchronizing the process data. In some implementations, the time-series industrial process data comprises time-synchronized data streams. Further, in at least one implementation, the time-synchronized data streams could comprise time stamps applied to the data streams, and/or the time-synchronized data streams could be synchronized by a time-synchronizing component such as a clock signal, GPS clock, industrial controller, time server, or some other system time signal.

Computing system 101 feeds the time-series industrial process data into machine learning model 102 associated with the industrial automation process to dynamically generate a process duration prediction for a first one of the process subsystems and responsively determine an updated set point for a second one of the process subsystems based on the process duration prediction for the first one of the process subsystems (502). In some implementations, computing system 101 could utilize machine learning model 102 to analyze the time-series industrial process data and dynamically generate the process duration prediction for the first one of the process subsystems. For example, machine learning model 102 could be trained with historical and empirical physical data models and performance curves representing the performance and behavior of the process subsystems, including physical data models and empirical performance curves for the individual industrial assets involved in each of the first and second ones of the process subsystems. In some examples, the data models and empirical curves associated with the process subsystems and their underlying industrial assets could identify process runtime durations for each of the subsystems and/or their individual associated industrial assets or components. For example, the process runtime durations could describe how long a process subsystem and/or an individual asset or series of assets in the subsystem takes to complete from start to finish based on historical data, manufacturer specifications, empirical observations over time, or any other techniques of determining process runtime durations. Machine learning model 102 could also be trained with maintenance data associated with the process subsystems and their associated industrial assets, including historical maintenance events for each of the assets involved in the process subsystems, recent maintenance performed on the assets of the subsystems, maintenance schedules, and any other maintenance information associated with the process subsystems. Accordingly, in some implementations machine learning model 102 could then infer the process duration prediction for the first one of the process subsystems by analyzing the physical data models and empirical performance curves for the first subsystems and the individual industrial asset or assets involved in the first subsystem along with the process runtime durations and the maintenance data for the first subsystem and any associated industrial assets. For example, as the performance of an industrial asset associated with the first process subsystem declines over time due to use and wear, and the length of time increases since a last maintenance event or service was performed on the asset, machine learning model 102 could analyze the physical model of the asset along with the time-series industrial process data and other information to predict that the duration of time that the asset will take to complete its operation will increase over time based on the predicted or observed performance degradation of the asset over time. In other words, machine learning model 102 could generate the process duration prediction for the first one of the process subsystems based on an estimation of performance degradation due to a duration of time elapsed since a last maintenance event for the first one of the process subsystems in some implementations. Other techniques of dynamically generating the process duration prediction for the first one of the process subsystems are possible and within the scope of this disclosure.

After dynamically generating the process duration prediction for the first one of the process subsystems, machine learning model 102 responsively determines an updated set point for a second one of the process subsystems based on the process duration prediction for the first one of the process subsystems. In some examples, machine learning model 102 could determine the updated set point for the second one of the process subsystems based on the process duration prediction for the first one of the process subsystems in order to better coordinate and synchronize these process subsystems and improve the overall stability and efficiency of the system. For example, in some implementations, when machine leaning model 102 generates the process duration prediction for the first one of the process subsystems by predicting that the process execution of the first subsystem would take a longer duration of time to complete based on the progressive decline in performance of the first subsystem over time, machine learning model 102 could responsively determine an updated set point for the second one of the process subsystems or at least one industrial asset associated with the second subsystem to help synchronize the first and second process subsystems. The updated set point helps to synchronize the first and second process subsystems because, in some implementations, the first and second process subsystems are interrelated process subsystems of the industrial automation process. For example, in at least one implementation, the second one of the process subsystems relies on an output of the first one of the process subsystems. Accordingly, in at least one implementation, if the first one of the process subsystems is predicted to take a longer duration to complete based on the process duration prediction, then machine learning model 102 could determine the updated set point for the second one of the subsystems based on the output of the first subsystem taking longer to complete. In other words, the updated set point for the second one of the process subsystems compensates for a delay in completion of the first one of the process subsystems based on the process duration prediction for the first one of the process subsystems in some implementations. Other techniques of determining the updated set point for the second one of the process subsystems based on the process duration prediction for the first one of the process subsystems are possible and within the scope of this disclosure.

Computing system 101 provides the updated set point for the second one of the process subsystems to industrial controller 130 associated with the second one of the process subsystems (503). For example, in at least one implementation, industrial controller 130 could comprise a programmable logic controller (PLC) that controls drives, motors, compressors, valves, levels, rates, and any other aspects of an industrial automation process. The updated set point for the second one of the process subsystems determined by machine learning model 102 may be provided by computing system 101 to industrial controller 130, which can then execute logic code to take action and make changes to apply the updated set point for the second one of the process subsystems. In at least one implementation, industrial controller 130 applies the updated set point for at least one industrial asset associated with the second one of the process subsystems. For example, industrial controller 130 may be responsible for controlling the at least one industrial asset associated with the second one of the process subsystems, and controller 130 could therefore apply the updated set point for the at least one industrial asset associated with the second one of the process subsystems to adjust the control and operation of the at least one industrial asset. As discussed above, in some implementations, the updated set point for the second one of the process subsystems could compensate for a delay in completion of the first one of the process subsystems based on the process duration prediction for the first one of the process subsystems. For example, if the first one of the process subsystems is predicted to take a longer duration to complete based on the process duration prediction, then the updated set point for the second one of the subsystems may be applied by industrial controller 130 to adjust and synchronize the operation of the second one of the subsystems to compensate for the output of the first subsystem taking longer to complete. Accordingly, industrial controller 130 may apply the updated set point for the second one of the process subsystems to better coordinate and synchronize the process subsystems and improve the overall stability and efficiency of the system.

Additionally or alternatively to determining the updated set point for the second one of the process subsystems, machine learning model could also determine updated set points or any other settings and adjustments for the first and second ones of the process subsystems or any additional process subsystems, or for the entire industrial automation process overall, including combinations thereof. For example, computing system 101 could provide the time-series industrial process data to machine learning model 102 to determine updated set points or other improved settings for the first, second, or any other additional ones of the process subsystems, or for overall master control of the entire industrial automation process. In some examples, the improved settings determined by machine learning model 102 could include improved timing and synchronization of the system and various subsystems and components, energy improvements that reduce the amount of energy used by each component or process, improved settings to reduce the amount of resources that are used and to increase the amount of output produced, and improvements in the overall process throughput. Further, in at least one implementation, machine learning model 102 could dynamically create updated set points in real time in order to achieve desired system output, and can determine these set points and other improvements for both individual process subsystems and the overall system. The desired system output may be provided to machine learning model 102 by industrial controller 130 in some examples. Further, in some implementations, the improved settings determined by machine learning model 102 could comprise updated offsets or values for a proportional, integral, and derivative (PID) control associated with one or more process subsystems and/or the entire industrial automation process. For example, if a disturbance occurs in a particular subsystem that causes the output to drop below threshold tolerance levels, a change to the PID control could be determined dynamically by machine learning model 102 and updated in real time to adjust for the disturbance and balance the relationship between the output of material into and out of the subsystem. Moreover, in some implementations, there could be several PID controls for each subsystem or industrial asset employed in the industrial automation process, and machine learning model 102 could determine improved settings for any or all of these PID controls to provide adaptive control over any of the subsystems and the entire industrial automation process overall.

In some examples, machine learning model 102 could also be adjusted dynamically to compensate for changes in performance over time. For example, because of their mechanical nature, the various industrial assets and subsystems employed in an industrial automation process can exhibit continual changes in operational characteristics and efficacy throughout their lifetime. As industrial assets progressively wear down and their performance curve changes, the physical models and empirical curves used to represent the components in machine learning model 102 becomes more inaccurate. Therefore, in order to compensate for performance degradation, the physical models representing various industrial assets and components may be continually adjusted over time, such as by calculating new offsets or other parameters associated with the models. In some examples, machine learning model 102 could be employed to calculate the offsets and other values needed to adjust the physical models in machine learning model 102 that represent the various industrial assets and components used in the industrial automation process. For example, in at least one implementation, computing system 101 could provide updated time-series industrial process data to machine learning model 102 that indicate a change in performance associated with the industrial automation process, and machine learning model 102 could be configured to automatically adjust machine learning model 102 to compensate for the change in performance. In this example, the change in performance associated with the industrial automation process could comprise any variation in operational characteristics or deviation in the performance curve model of components used in the industrial automation process that may be analyzed to determine adjustments for machine learning model 102 to compensate for the change in performance. In some implementations, machine learning model 102 could include a dynamic model established for each process subsystem or for each industrial asset or component used in the industrial automation process, which may be continually updated by utilizing the self-learning capabilities of machine learning model 102 in order to provide adaptive control that compensates for deteriorating performance and other variations caused by performance degradation of the various assets and components.

Advantageously, computing system 101 utilizes machine learning model 102 to determine an updated set point for a second one of the process subsystems based on a process duration prediction for a first one of the process subsystems. By continually collecting, time synchronizing, and analyzing the time-series industrial process data, computing system 101 can utilize machine learning model 102 to continuously generate updated process runtime duration predictions for process subsystems as their performance changes over time, and responsively determine updated set points and other improved settings for any related process subsystems in order to compensate for the change. In this manner, the industrial automation process can be streamlined with improved synchronization of the process subsystems, thereby achieving better efficiency and increased system output and process stability.

Now referring back to FIG. 1, computing system 101 comprises a processing system and communication transceiver. Computing system 101 may also include other components such as a user interface, data storage system, and power supply. Computing system 101 may reside in a single device or may be distributed across multiple devices. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof. In some implementations, computing system 101 could comprise a mobile device capable of operating in a server-like fashion which, among other uses, could be utilized in a wireless mesh network.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, packet networks, cellular networks, wireless mesh networks (WMN), local area networks (LAN), metropolitan area networks (MAN), wide area networks (WAN), or other network topologies, equipment, or systems, including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, communication network 120 includes further access nodes and associated equipment for providing communication services to several computer systems across a large geographic region.

Industrial controller 130 generally comprises a processing system and communication transceiver. Industrial controller 130 may reside in a single device or may be distributed across multiple devices. Industrial controller 130 may be a discrete system or may be integrated within other systems, including other systems within industrial automation environment 100 or an automation control system. In some examples, industrial controller 130 could comprise automation controllers, programmable logic controllers (PLCs), programmable automation controllers (PACs), or any other controllers used in automation control. In some implementations, a PLC, PAC, and/or specific modules within a PLC rack could provide some or all of the functionality described herein for industrial controller 130. In some examples, industrial controller 130 could comprise a ControlLogix® control system provided by Rockwell Automation, Inc.

Database system 140 may comprise any computer-readable storage media capable of storing data. Database system 140 may include volatile and nonvolatile, removable and non-removable media implemented in any method or technology for storage of information, such as computer readable instructions, data structures, program modules, or other data. Database system 140 may be implemented as a single storage device but may also be implemented across multiple storage devices or sub-systems co-located or distributed relative to each other. In some implementations, database system 140 may comprise a processing system or some other type of processing circuitry. Database system 140 may comprise additional elements, such as a controller, capable of communicating with a processing system. In some examples, database system 140 could comprise random-access memory, read-only memory, magnetic disks, optical disks, integrated circuits, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media.

Turning now to FIG. 6, a block diagram is shown that illustrates computing system 600 in an exemplary implementation. Computing system 600 provides an example of computing system 101 or any computing system that may be used to execute subsystem synchronization process 500 or variations thereof, although computing system 101 could use alternative configurations. Computing system 600 includes processing system 601, storage system 603, software 605, communication interface 607, and user interface 609. User interface 609 comprises display system 608. Software 605 includes application 606 which itself includes subsystem synchronization process 500. Subsystem synchronization process 500 may optionally be implemented separately from application 606, as indicated by the dashed line in FIG. 6.

Computing system 600 may be representative of any computing apparatus, system, or systems on which application 606 and subsystem synchronization process 500 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for subsystem synchronization process 500 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer-readable storage media capable of storing software 605 and readable by processing system 601. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 609, processing system 601 may load and execute portions of software 605, such as subsystem synchronization process 500, to render a graphical user interface for application 606 for display by display system 608 of user interface 609. Software 605 may be implemented in program instructions and among other functions may, when executed by computing system 600 in general or processing system 601 in particular, direct computing system 600 or processing system 601 to receive time-series industrial process data associated with a plurality of process subsystems of an industrial automation process. Software 605 may further direct computing system 600 or processing system 601 to feed the time-series industrial process data into a machine learning model associated with the industrial automation process to dynamically generate a process duration prediction for a first one of the process subsystems and responsively determine an updated set point for a second one of the process subsystems based on the process duration prediction for the first one of the process subsystems. In addition, software 605 directs computing system 600 or processing system 601 to provide the updated set point for the second one of the process subsystems to an industrial controller associated with the second one of the process subsystems.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate synchronization of industrial assets in an industrial automation environment as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-storage media are characterized as primary or secondary storage.

In some examples, if the computer-storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606 and/or subsystem synchronization process 500 (and variations thereof). However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input from a user. Output devices such as display system 608, speakers, haptic devices, and other types of output devices may also be included in user interface 609. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some examples.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more computer-readable storage media having program instructions stored thereon to facilitate synchronization of industrial assets in an industrial automation environment, wherein the program instructions, when executed by a computing system, direct the computing system to at least:

receive time-series industrial process data associated with a plurality of process subsystems of an industrial automation process;

feed the time-series industrial process data into a machine learning model associated with the industrial automation process to dynamically generate a process duration prediction for a first one of the process subsystems and responsively determine an updated set point for a second one of the process subsystems based on the process duration prediction for the first one of the process subsystems, wherein the updated set point for the second one of the process subsystems compensates for a delay in completion of the first one of the process subsystems; and provide the updated set point for the second one of the process subsystems to an industrial controller associated with the second one of the process subsystems.

2. The one or more computer-readable storage media of claim 1 wherein the industrial controller applies the updated set point for at least one industrial asset associated with the second one of the process subsystems.

3. The one or more computer-readable storage media of claim 1 wherein the second one of the process subsystems relies on an output of the first one of the process subsystems.

4. The one or more computer-readable storage media of claim 1 wherein the machine learning model associated with the industrial automation process uses at least the time-series industrial process data to calculate at least an adjustment of one or more of the industrial assets.

5. The one or more computer-readable storage media of claim 1 wherein the process duration prediction for the first one of the process subsystems is based on an estimation of performance degradation due to a duration of time elapsed since a last maintenance event for the first one of the process subsystems.

6. The one or more computer-readable storage media of claim 1 wherein the time-series industrial process data comprises time-synchronized data streams.

7. The one or more computer-readable storage media of claim 6 wherein the time-synchronized data streams comprise time stamps applied to the data streams.

8. A method to facilitate synchronization of industrial assets in an industrial automation environment, the method comprising:

receiving time-series industrial process data associated with a plurality of process subsystems of an industrial automation process;

feeding the time-series industrial process data into a machine learning model associated with the industrial automation process to dynamically generate a process duration prediction for a first one of the process subsystems and responsively determine an updated set point for a second one of the process subsystems based on the process duration prediction for the first one of the process subsystems, wherein the updated set point for the second one of the process subsystems compensates for a delay in completion of the first one of the process subsystems; and providing the updated set point for the second one of the process subsystems to an industrial controller associated with the second one of the process subsystems.

9. The method of claim 8 wherein the industrial controller applies the updated set point for at least one industrial asset associated with the second one of the process subsystems.

10. The method of claim 8 wherein the second one of the process subsystems relies on an output of the first one of the process subsystems.

11. The method of claim 8 wherein the machine learning model associated with the industrial automation process uses at least the time-series industrial process data to calculate at least an adjustment of one or more of the industrial assets.

12. The method of claim 8 wherein the process duration prediction for the first one of the process subsystems is based on an estimation of performance degradation due to a duration of time elapsed since a last maintenance event for the first one of the process subsystems.

13. The method of claim 8 wherein the time-series industrial process data comprises time-synchronized data streams.

14. The method of claim 13 wherein the time-synchronized data streams comprise time stamps applied to the data streams.

15. An apparatus to facilitate synchronization of industrial assets in an industrial automation environment, the apparatus comprising:

one or more computer-readable storage media; and program instructions stored on the one or more computer-readable storage media that, when executed by a processing system, direct the processing system to at least:

receive time-series industrial process data associated with a plurality of process subsystems of an industrial automation process;

feed the time-series industrial process data into a machine learning model associated with the industrial automation process to dynamically generate a process duration prediction for a first one of the process subsystems and responsively determine an updated set point for a second one of the process subsystems based on the process duration prediction for the first one of the process subsystems, wherein the updated set point for the second one of the process subsystems compensates for a delay in completion of the first one of the process subsystems; and provide the updated set point for the second one of the process subsystems to an industrial controller associated with the second one of the process subsystems.

16. The apparatus of claim 15 wherein the industrial controller applies the updated set point for at least one industrial asset associated with the second one of the process subsystems.

17. The apparatus of claim 15 wherein the second one of the process subsystems relies on an output of the first one of the process subsystems.

18. The apparatus of claim 15 wherein the machine learning model associated with the industrial automation process uses at least the time-series industrial process data to calculate at least an adjustment of one or more of the industrial assets.

19. The apparatus of claim 15 wherein the process duration prediction for the first one of the process subsystems is based on an estimation of performance degradation due to a duration of time elapsed since a last maintenance event for the first one of the process subsystems.

20. The apparatus of claim 15 wherein the time-series industrial process data comprises time-synchronized data streams.

* * * * *